Aug. 20, 1946. W. H. FAUSZ 2,406,209
INSTANT RELEASE MEANS FOR PARACHUTE HARNESS
Filed Oct. 10, 1944
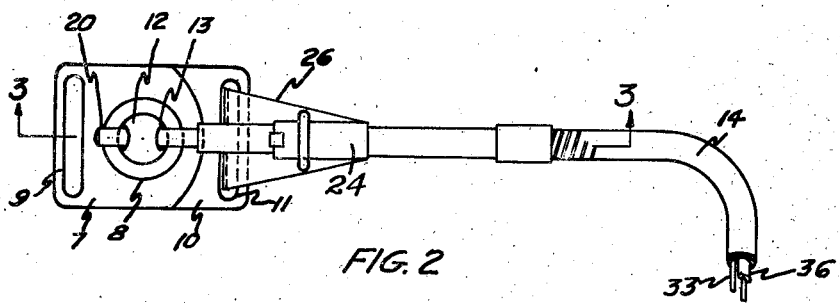
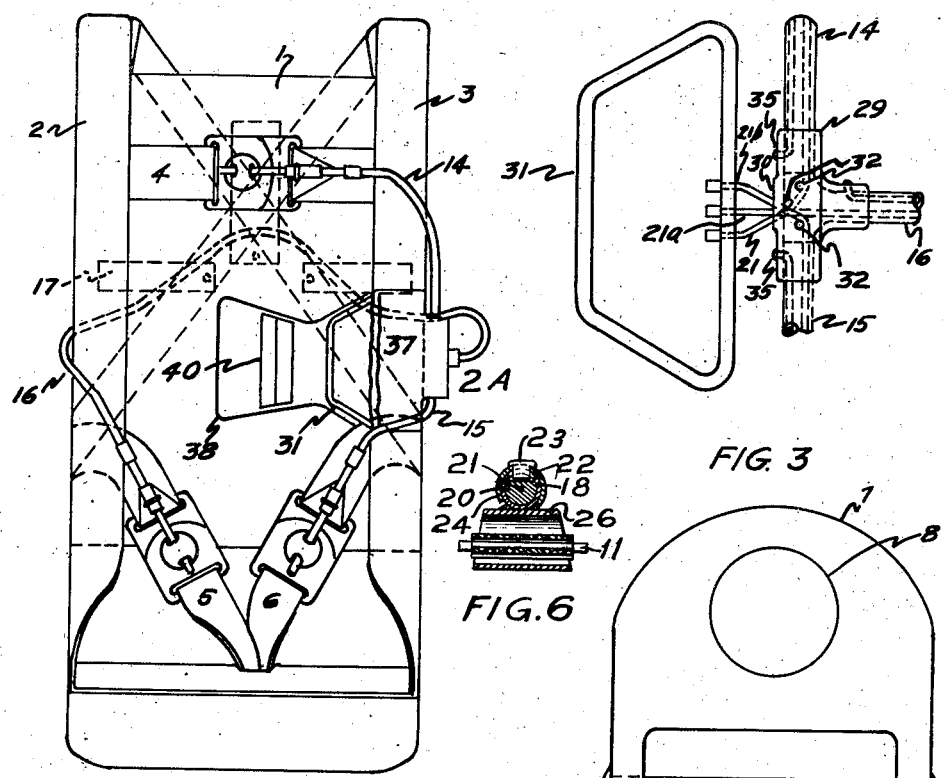
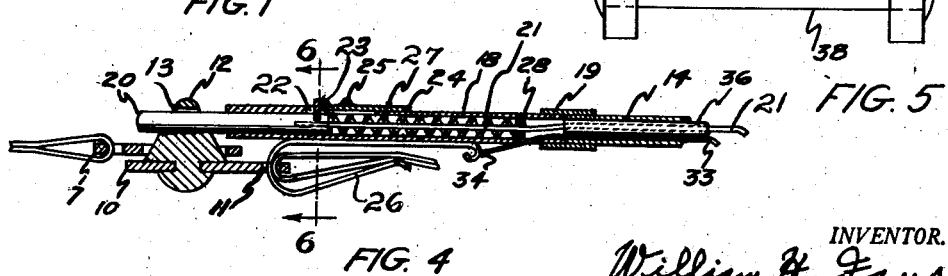
INVENTOR.
William H. Fausz
BY
Allen & Allen
Attorneys Patented Aug. 20, 1946

2,406,209

UNITED STATES PATENT OFFICE 2,406,209

INSTANT RELEASE MEANS FOR PARACHUTE HARNESS

William H. Fausz, Newport, Ky.

Application October 10, 1944, Serial No. 558,009

13 Claims. (Cl. 244—151)

My invention relates to means whereby a parachute jumper can quickly free himself from the parachute harness and its appurtenances including the parachute. Such means are required to prevent injury to the parachutist by dragging upon landing, or to permit him to extricate himself easily and instantly in any situation requiring his release from the harness.

In a co-pending application entitled "Quick release means for parachute harness," Serial No. 512,368, filed November 30, 1943, I have taught the combination of a harness and quick release means at a plurality of points, which means are operable from a single operating point and by means of a single operating handle.

The principal object of the present invention is the provision of improvements on the structures therein disclosed, especially in the direction of simplification and greater positiveness of action as will hereinafter be made clear.

It is also an object of my invention to provide novel disengagement means for the purpose inclusive of means which may be independently engaged to fasten the parachute harness about the person of the user, but without the operation of the handle during such engagement.

It is also an object of my invention to provide engagement and disengagement means so arranged and located as to be out of the user's way, impossible of accidental operation, and non-fouling as respects parachute cords or other paraphernalia.

These and other objects of my invention which will be set forth hereinafter, or will be apparent to one skilled in the art upon reading these specifications, I accomplish by that certain structure and arrangement of parts of which I shall hereinafter describe exemplary embodiments.

Reference is made to the accompanying drawing wherein:

Figure 1 is a front view of a parachute harness equipped with my invention, and shown in elevation is the position which the various harness elements occupy when in operative position on the person of the user.

Figure 2 is a plan view of one of my release assemblies.

Figure 3 shows in plan the operating handle and the arrangement of cable guides and conduit connectors at the point of operation.

Figure 4 is a sectional view corresponding to Figure 2.

Figure 5 is a plan view of a modified plate.

Figure 6 is a cross-sectional view taken along the line 6—6 of Figure 4.

My invention is applicable to ordinary parachute harness which is fastened together and opened at three separate points, viz., intermediate a breast strap, and intermediate two leg straps. In Figure 1, I have indicated a parachute harness of ordinary form having a back member 1, to which are attached side straps 2 and 3. It is to these side straps that the parachute straps themselves (not shown), are fastened in ordinary practice. A breast strap is indicated at 4 and leg straps at 5 and 6.

Each of these straps is severed intermediate its length and is provided with an attachment means hereinafter described.

At each point of severance one of the strap ends is fastened in a suitable fashion to a metal plate 7, perforated as at 8. The plate may be slotted as at 9 so that the strap end can be passed through the slot doubled upon itself, and the doubled portions sewn or otherwise fastened together. The other strap end at each severance point is similarly fastened to a metal plate 10, similarly slotted as at 11. Or the plates may have a removable pintle 38 as in Figure 5, which permits the plates to be fastened to preformed strap loops, or old harness from which plates have been removed. This plate, however, bears a conical stud 12, adapted to pass through the perforation 8 in the other plate. The conical stud near its outer end is transversely bored or perforated as at 13, and it will be clear that if the stud is first passed through the hole in plate 7 and a pin inserted through the perforation 13 to prevent withdrawal of the stud, the two plates and hence the strap ends, will be engaged. The conical shape of the stud permits a ready separation of the plate, however, when the pin is withdrawn, and indeed enforces such a separation if tension is placed on the strap ends. The stud may be riveted, welded, or otherwise attached to plate 10, and may be fixed or rotatable thereon. It is an advantage of my present structure that the operating means hereinafter described follow the general direction of the straps so that the studs need not be rotatively mounted on their respective plates.

The pins which I have mentioned are in my structure operated for release through the agency of cables passing through flexible sheaths, the sheaths and cables being brought to a common operating point where the cables are engaged with a common handle, and where the sheaths are fastened together and anchored. The common operating point is indicated in Figure 1 generally at A, and is a point on one of the side straps of the harness. A sheath 14 from the point of severance of the breast strap follows that strap to the side strap 3, and thence downwardly to the operating point. A sheath 15 from the left-hand leg strap severance point follows that strap substantially directly to the operating point. A sheath 16 follows the right hand leg strap in an upwardly direction and then passes behind the body of the wearer reaching the operating point from the wearer's back as shown. It may be held in place on the back portion of the parachute harness by detachable straps indicated at 17 in Figure 1.

The sheaths are preferably flexible metal sheaths of spirally wound formation of the general type of those employed in making "armored conductors" in the electrical industry; but it is simply necessary for my purpose that the sheaths be flexible and of sufficient transverse stiffness to prevent collapse under the strains to which they may be subjected.

The ends of the sheaths, for example the sheath 14 in Figure 4, are fastened to tubes 18. This may be done by means of a collar 19 slipped over the ends of the sheath and tube, and welded, soldered, brazed or swedged in place. In the outer end of each such tube there is slidably mounted a plunger or pin 20, to be operated by a cable 21 passing through the tube and sheath. This pin passes through the stud 12 as shown, and as has been explained above. The tube 18 has a longitudinal orifice indicated in Figures 4 and 6 at 22, through which a projection 23 on the pin extends. This projection is fastened to a tubular part 24, the underside of which is cut away, and which slides over the outside of the tube 18 and covers the perforation in it. The tubular member 24 is an operating member as will hereinafter be explained, and it is provided with an operating ridge 25; but this ridge is rounded so that parachute cords or other elements engaging it will not catch but will slip over it without moving the member 24.

The tube 18 is brazed, welded, soldered or otherwise fastened to a strip of metal 26, which overlies the loop of a parachute harness strap and passes with it through the slot 11 of the lower fastening plate 10. This results in anchoring the tube 18 and the end of the sheath which is attached to it to the plate 10, and prevents a pull on the sheath itself from disengaging the pin 20 from the stud 12. This strip 26 also acts as a keeper by maintaining the loop of the strap in position and prevents sliding of the plate 10 along the strap. Within the tube 18 there is a compression spring 27, one end of which bears against the pin 20, and the other end of which bears against an abutment member 28 in the tube 18. This abutment member is integral with the tube or is rigidly fastened in place therein, and the cable 21 passes therethrough.

The other ends of the several sheaths 14, 15 and 16 are brought together at the operating point and are preferably there fastened as by welding, brazing, swedging, or the like, to the branch arms of a T-shaped fitting 29, which in turn may be fastened directly to the side strap of the parachute harness. This fitting has an opening opposite its intermediate branch as at 30, and the cables 21, 21a and 21b from the several sheaths pass through this opening and are engaged in any suitable way with an operating handle 31, which is preferably of closed shape. This may be done by passing the cables loosely through holes in the handle and providing them with heads as shown. Within the fitting 29, I preferably provide rollers 32 to guide the cables and eliminate frictional resistance. It will be understood in the light of the explanation above, that a pull on the handle 31 will simultaneously pull the several cables, withdrawing the several pins 20 from their studs, and in this fashion causing the breast and leg straps 4, 5 and 6 of the parachute to come apart intermediate their length. The user of the parachute may thus be instantly freed of the parachute and harness.

In order to prevent accidental tensioning of the cables as might occur by stretching of the sheaths under strain, I take precautions to prevent such stretching. The sheaths are, as has been described, anchored at both ends; but they are ordinarily somewhat stretchable, the total stretchability increasing with their length. To prevent stretching, I pass through each sheath a flexible, but nonstretchable metal cable 33, preferably a braided wire cable. Each such safety cable is anchored to the spring clip or strip 26 by welding, or other suitable expedient, as at 34, and is also similarly anchored to the fitting 29 as at 35. The length of each such safety cable is gauged either to prevent any stretching of the sheath through which it passes, or to prevent stretching beyond an allowable maximum which will not withdraw the pin 20. To prevent fouling of the safety and operating cables, and also to reduce friction on the operating cable, I preferably pass it through its sheath within a flexible tube 36 which engages it loosely, but which serves as a continuous bearing for the operating cable. Such tubes are conveniently made from any of a variety of synthetic plastics, or sections of small copper or brass tubing.

In order to prevent accidental operation of the handle 31, it is encased in some suitable fashion as in a pouch-like structure 37 affixed to the side strap of the parachute harness, covering a part or all of the fitting 29, and the exposed portions of the operating cables 21, 21a and 21b, and preferably also a portion of the operating handle. A flap 38 is used to cover the remainder of the operating handle. Where the parachute is of a type requiring operation of a rip cord by the user, the rip cord handle may be brought to the same operating position and a portion of it included in the pouch. The flap 38 may be tucked or otherwise fastened into the pouch in such a way that operation of the rip cord handle withdraws the flap and presents the release handle 31 for subsequent operation. The stiffening reinforcements 40 in the flap 38 may be employed to prevent simultaneous accidental engagement of both handles.

The pin 20 may be moved by means of the operating member 24, 25, manually, without disturbing the operating handle 31. The user may thus put on or take off his parachute harness at any time he wishes without impairing the adjustment of the parts or the readiness of the release means. Also, should anything go wrong with the release means, the user is able manually to divest himself of the parachute harness with less difficulty than is encountered in the use of ordinary harness hooks. The release may be effected by one hand, since it is not necessary to relieve the tension on the straps to effect the release. The rounded configurations of elements 24 and 25 however, prevent fouling and accidental release.

Modifications may be made in my invention without departing from the spirit of it.

Having thus described my invention in an exemplary embodiment, what I claim as new and desire to secure by Letters Patent is:

1. In combination with a parachute harness having side straps, a breast strap and two leg straps, points of separation in the breast and leg straps, strap portions at these points being respectively provided with plates one of which bears a conical stud and the other of which is perforated to accept the stud, means engaging the stud to prevent its passage through the perforation, and means connecting said last mentioned means with an operating handle at a common operating point adjacent a side strap of the harness, said means comprising metal sheaths anchored to one of the said plates at one end and anchored at a common operating point at the other, and flexible cables passing through said sheaths attached at one end to said stud engagement means and at the other to a common operating handle, two of said sheath means following straps directly to the common operating point, and the third passing around the harness rearwardly of the body of a user to approach the common operating point from the other side.

2. The structure claimed in claim 1 wherein each sheath is a flexible structure and the longer sheath at least is provided with an interior flexible, but non-stretchable, safety cable anchored at both ends to prevent the stretching of the sheath.

3. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor.

4. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass.

5. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass, and containing anti-frictional guide means for said operating cables.

6. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass, and containing anti-frictional guide means for said operating cables, there being at each point of strap separation a tube to which the sheaths are respectively attached, a pin slidably mounted in said tube for passing through a perforation in the said stud, a semi-tubular operating means engaging said tube exteriorly, slidable thereon and fastened to said pin by means passing through a slot in said first mentioned tube, said semi-tubular operating means having rounded, anti-fouling configurations, said tubes containing spring means for urging said pins outwardly.

7. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass, and containing anti-frictional guide means for said operating cables, there being at each point of strap separation a tube to which the sheaths are respectively attached, a pin slidably mounted in said tube for passing through a perforation in the said stud, a semi-tubular operating means engaging said tube exteriorly, slidable thereon and fastened to said pin by means passing through a slot in said first mentioned tube, said semi-tubular operating means having rounded, anti-fouling configurations, said tubes containing spring means for urging said pins outwardly, said safety cables being respectively anchored with respect to said tubes and with respect to said fitting.

8. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass, and containing anti-frictional guide means for said operating cables, there being at each point of strap separation a tube to which the sheaths are respectively attached, a pin slidably mounted in said tube for passing through a perforation in the said stud, a semi-tubular operating means engaging said tube exteriorly, slidable thereon and fastened to said pin by means passing through a slot in said first mentioned tube, said semi-tubular operating means having rounded, anti-fouling configurations, said tubes containing spring means for urging said pins outwardly, said safety cables being respectively anchored with respect to said tubes and with respect to said fitting, and at the operating point a pouch having a movable flap for enclosing and preventing accidental operation of said operating handle.

9. The structure claimed in claim 1 wherein each sheath is a flexible structure and the longer sheath at least is provided with an interior flexible, but non-stretchable, safety cable anchored at both ends to prevent the stretching of the sheath, and in which the first mentioned operating cable passes through the sheath within a flexible tube serving as a bearing therefor, and in which the ends of the several sheaths at the operating point are fastened to a common fitting having an opening through which the several cables pass, and containing anti-frictional guide means for said operating cables, there being at each point of strap separation a tube to which the sheaths are respectively attached, a pin slidably mounted in said tube for passing through a perforation in the said stud, a semi-tubular operating means engaging said tube exteriorly, slidable thereon and fastened to said pin by means passing through a slot in said first mentioned tube, said semi-tubular operating means having rounded, anti-fouling configurations, said tubes containing spring means for urging said pins outwardly, said safety cables being respectively anchored with respect to said tubes and with respect to said fitting, and at the operating point a pouch having a movable flap for enclosing and preventing accidental operation of said operating handle, and an operating handle for a rip cord partially engaged in said pouch and adapted upon actuation to release said flap thereby freeing said first mentioned operating handle, said flap containing reinforcing stiffening means to prevent accidental operation of said first mentioned operating handle.

10. In apparatus of the character described, a slotted plate, a strap passing through the slot in said plate, doubled and fastened, anchoring means also passing through the slot in said plate, a tubular member fastened to said anchoring means, a pin member slidable in said tubular member, an operating means for said pin member slidable over said tubular member and having attachment to said pin by means passing through a slot in said tubular member, a spring in said tubular member for urging said pin to an outward position, a flexible sheath attached to said tubular member and a second operating means for said pin, said second operating means being a flexible cable passing through said tubular member and through said sheath.

11. In apparatus of the character described, a slotted plate, a strap passing through the slot in said plate, doubled and fastened, anchoring means also passing through the slot in said plate, a tubular member fastened to said anchoring means, a pin member slidable in said tubular member, an operating means for said pin member slidable over said tubular member and having attachment to said pin by means passing through a slot in said tubular member, a spring in said tubular member for urging said pin to an outward position, a flexible sheath attached to said tubular member and a second operating means for said pin, said second operating means being a flexible cable passing through said tubular member and through said sheath, and a second cable passing through said sheath and anchored with respect to the ends of said sheath to prevent stretching thereof.

12. In apparatus of the character described, a slotted plate, a strap passing through the slot in said plate, doubled and fastened, anchoring means also passing through the slot in said plate, a tubular member fastened to said anchoring means, a pin member slidable in said tubular member, an operating means for said pin member slidable over said tubular member and having attachment to said pin by means passing through a slot in said tubular member, a spring in said tubular member for urging said pin to an outward position, a flexible sheath attached to said tubular member and a second operating means for said pin, said second operating means being a flexible cable passing through said tubular member and through said sheath, and a second cable passing through said sheath and anchored with respect to the ends of said sheath to prevent stretching thereof, and a flexible bearing tube within said sheath through which said first mentioned cable passes.

13. In apparatus of the character described, a slotted plate, a strap passing through the slot in said plate and doubled upon itself, anchoring means comprising a clip also passing through the slot and enclosing the strap to prevent sliding of the same, a tubular member fastened to said anchoring means, a pin member slidable in said tubular member, a spring in said tubular member for urging said pin to an outward position, a flexible sheath attached to said tubular member and an operating means for said pin comprising a flexible cable passing through said tubular means and through said sheath.

WILLIAM H. FAUSZ.